United States Patent [19]
Koseki et al.

[11] Patent Number: 5,682,278
[45] Date of Patent: Oct. 28, 1997

[54] DISK CHUCKING DEVICE

[75] Inventors: Hideaki Koseki; Hidenori Takahira, both of Furukawa; Tomohiro Teshima, Mtsuyama-machi, all of Japan

[73] Assignee: Alps Electric Co., Ltd., Tokyo, Japan

[21] Appl. No.: 533,141

[22] Filed: Sep. 25, 1995

Related U.S. Application Data

[63] Continuation of Ser. No. 304,644, Sep. 12, 1994, abandoned, which is a continuation of Ser. No. 25,347, Mar. 2, 1993, abandoned.

[30] Foreign Application Priority Data

| Mar. 9, 1992 | [JP] | Japan | 4-011628 U |
| Jul. 24, 1992 | [JP] | Japan | 4-052297 U |

[51] Int. Cl.$^6$ ............................ G11B 17/28; G11B 23/00
[52] U.S. Cl. ........................ 360/99.08; 369/271
[58] Field of Search ................. 360/99.05, 99.08, 360/99.12, 99.04; 369/270, 271

[56] References Cited

U.S. PATENT DOCUMENTS

| 4,654,725 | 3/1987 | Wakaizumi | 360/99.08 |
| 4,700,245 | 10/1987 | Sakaguchi | 360/97 |
| 4,707,751 | 11/1987 | Ozaki et al. | 360/99.08 |
| 4,758,915 | 7/1988 | Sakaguchi | 360/99.04 |
| 4,896,232 | 1/1990 | Sugawara | 360/99.08 |
| 5,010,427 | 4/1991 | Taguchi et al. | 360/99.08 |
| 5,103,358 | 4/1992 | Munekata | 360/99.04 |
| 5,138,606 | 8/1992 | Nishizawa | 360/99.12 |

*Primary Examiner*—Stuart S. Levy
*Assistant Examiner*—David D. Davis
*Attorney, Agent, or Firm*—Guy W. Shoup; Patrick T. Bever

[57] ABSTRACT

A chucking device for receiving and rotating a magnetic disk, the magnetic disk having a centrally-located drive spindle receiving hole and an off-center alignment hole. The chucking device includes a turntable, a drive spindle centrally-located on the turntable, and a support plate including a drive pin and a contact wall. The contact wall is formed adjacent the drive pin and is used to rotate the magnetic disk by pressing against an inner wall of the alignment hole. The drive pin is made of a low friction material, such as synthetic resin, and extends above the contact wall such that when the magnetic disk is mounted on the disk chucking device, the drive pin slides easily against the hub until the drive pin and contact wall are received in the alignment hole.

8 Claims, 8 Drawing Sheets

DISK CHUCKING DEVICE

This application is a continuation of application Ser. No. 08/304,644 filed Sep. 12, 1994 now abandoned, which is a continuation of application Ser. No. 08/025,347 filed Mar. 2, 1993 now abandoned.

BACKGROUND OF THE INVENTION

1. Field of the Invention

The present invention relates to a disk chucking device employed for a disk drive unit that chucks an information recording disk, drives the disk to rotate, and records or regenerates information. More particularly, this invention is concerned with a disk chucking device suitable for chucking a so-called 3.5"-diameter floppy disk.

2. Description of the Prior Art

In a disk drive unit for driving a disk-like information recording medium (hereafter, referred to as a disk), a variety of improvements and inventions have been proposed in efforts to improve recording density or to realize downsizing and weight cutting. In one of the proposals, for recording or regeneration information, a turntable is attached to a spindle, and then a disk is driven to rotate via a drive pin projecting from the disk loading surface of the turntable.

FIGS. 11 to 13 show an example of a major portion of this kind of disk drive unit known conventionally. FIG. 11 is a plan view of the major portion of the disk drive unit. FIGS. 12a and 12b are a plan view and a front view of a blade spring. FIGS. 13a, 13b, 13c, and 13d are explanatory diagrams showing the operating states of the blade spring.

In these drawings, a disk driving section of the disk drive unit consists mainly of a disk drive motor 1, a spindle 2 for the disk drive motor 1, a turntable 3 attached to the distal end of the spindle 2, and a drive pin 19 having a cylinder (roller) that is supported by a blade spring 17 attached to the bottom of the turntable 3, and inserted in a drive pin insertion hole 13 bored on the turntable 3, and whose outer circumferential portion is rotatable.

The turntable 3 has a center hole 12 in which the spindle 2 of the disk drive motor 1 is inserted, a drive pin inserting hole 13 in which the drive pin 19 is inserted, and an attachment hole 14 to which a member for fixing the blade spring 17, for example, an eyelet is fitted with pressure. An anti-friction plastic sheet is adhering to the central portion of the surface of the turntable 3. A chucking magnet 16 such as a rubber magnet is adhering to the front surface excluding the center hole 12, drive pin insertion hole 13, and plastic sheet. The blade spring 17 is a thin plate made of a material with excellent elasticity; such as, phosphor bronze, and shaped like an arc. A distal end 19a of the drive pin 19 fixed to the distal end of the blade spring 17 penetrates through the drive pin insertion hole 13 bored on the turntable 3 and projects from the top of the turntable 3.

FIG. 15 shows an example of a disk 23 having a metallic hub. The disk 23 has, as shown in FIG. 15, a magnetic recording layer on the surface thereof, and is encased in a rigid envelope 24a to form a disk cartridge 24. In the center of the disk 23, a metallic hub 25 of a metallic thin plate having magnetism is locked. A substantially square chucking hole 26, in which the distal end 2a of the spindle 2 is inserted, is bored in the center of the metallic hub 25. A substantially rectangular alignment hole 27, to which the distal end 19a of the drive pin 19 is fitted for engagement, is bored on the outer circumferential area of the metallic hub 25.

When the disk cartridge 24 is placed on the turntable 3, the chucking magnet 16 attracts the metallic hub 25. Then, the distal end 2a of the spindle 2 is inserted in the chucking hole 26. At this time, the drive pin 19 is pressed down in the opposite direction of a disk loading direction against spring force of the blade spring 17 by means of the metallic hub 25, and then pushed into the drive pin inserting hole 13 on the turntable 3. Then, as shown in FIG. 13a, the drive pin 19 is located under the metallic hub 25. Then, the turntable 3 rotates in an arrow-F direction in FIG. 13a (FIG. 13b). When the drive pin 19 agrees with the position of the alignment hole 27, as shown in FIG. 13c, the drive pin 19 is fitted in the alignment hole 27. When the turntable 3 further rotates, as shown in FIG. 13d, the drive pin 19 comes into contact with an inner margin 27a of the outer circumference of the alignment hole 27. The elastic force of the blade spring 17 causes the entire disk 23 (including the metallic hub 25) to move from the spindle 2 toward the drive pin 19 or radially outward. The spindle 2 is pushed away to that corner 26a of the chucking hole 26 located farthest from the alignment hole 27. Then, centering is carried out. Then, with the spindle 2 as a center, the metallic hub 25 and disk 23 rotate in the arrow-F direction. Consequently, recording or regeneration is achieved.

FIG. 14 includes explanatory diagrams showing structures of a drive pin 19 for a conventional disk chucking device. As shown in FIG. 14a, a normal structure is made of a metallic material or a resin. As shown in FIG. 14b, a drive pin 19 whose surface is made of a metallic material may be coated with a coating layer 19b made of a resin.

In the aforesaid prior art, the drive pin 19 attached to the distal end of the blade spring 17 is usually made of a rigid metal. When the drive pin 19 rubs against the bottom 25 of a center core of the metallic hub 25, sound is heard, or a trace of rubbing against the center core (hereafter, referred to as a metallic hub 25) is left. As for the drive pin 19 made of a resin, when chucked, the portion thereof fitted in the inner margin 27a of the alignment hole 27 is torn. This results in a short service life. As for a metallic drive pin 19 coated with a resin, the coating is peeled off gradually as working time increases. This results in poor durability. The use of a blade spring, caulking pin, roller, or the like results in a large number of parts and high manufacturing costs.

SUMMARY OF THE INVENTION

The present invention attempts to solve the foregoing problems of a prior art. An object of the invention is to provide a disk chucking device realizing reduction in the number of parts, enabling prevention of abrasion of a drive pin during alignment (chucking) by bringing the rigid portion of the drive pin into contact with a metallic hub and thus permitting reliable chucking, and improving durability by causing no traces even when the drive pin rubs against the bottom of the metallic hub.

To achieve the foregoing object, the present invention provides a disk chucking device comprising a drive spindle fitted in a center hole of an information recording disk, a turntable that is attached to the drive spindle and rotates as part of the drive spindle, and a support plate one of whose ends is supported by the turntable and the other one of whose ends is provided with a drive pin fitted to a drive pin fitting hole bored at a decentered position on the information recording disk. The drive pin is made of a less frictional material. A contact wall is formed in that portion of the drive pin engaging with that surface of the information recording disk having the drive pin fitting hole. The apex of the drive pin lies higher than the top of the contact wall.

3

In the foregoing means, the contact wall is formed as part of that side face of the drive pin engaging with the surface having the drive pin fitting hole. The drive pin is made of a less frictional material. The apex of the drive pin lies higher than the top of the contact wall. Therefore, during alignment, the rigid portion of the drive pin comes into contact with the metallic hub to permit reliable chucking. Even when the drive pin rubs against the bottom of the metallic hub, no traces are left.

DESCRIPTION OF THE PREFERRED EMBODIMENTS

Embodiments of the present invention will be described with reference to the drawings. Hereafter, components identical to or regarded as identical to those in the aforesaid prior art are assigned the same numerals. The duplicate description will be omitted.

Figure 1:
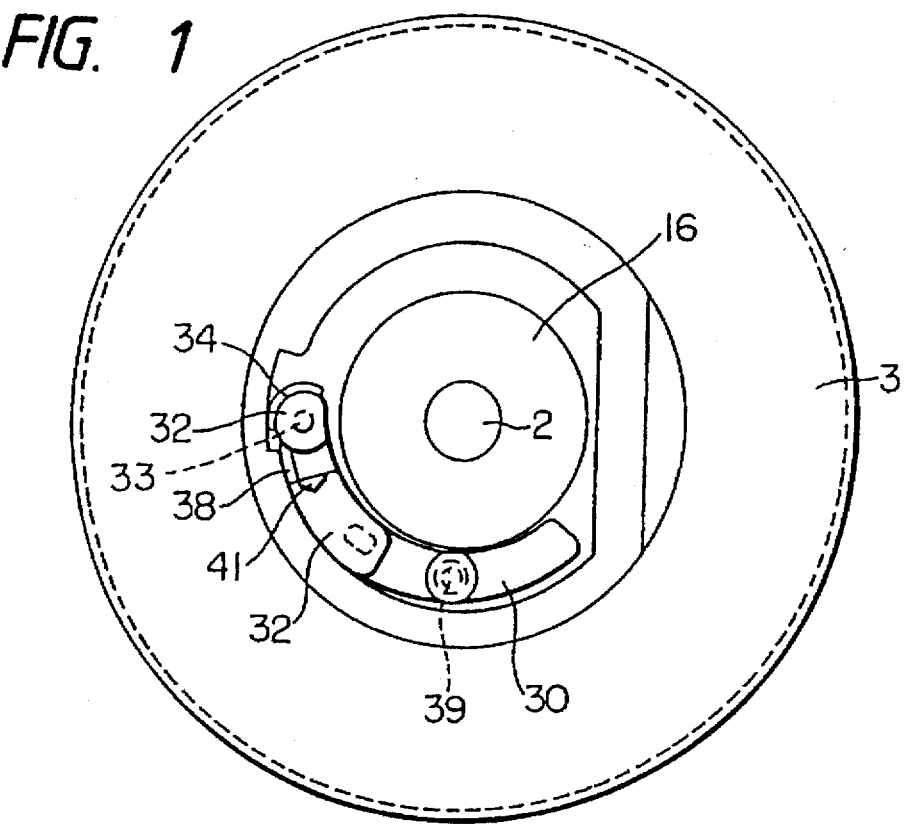
FIG. 1 is a plan view of a disk chucking device of the first embodiment relating to the present invention.
Figure 2A:
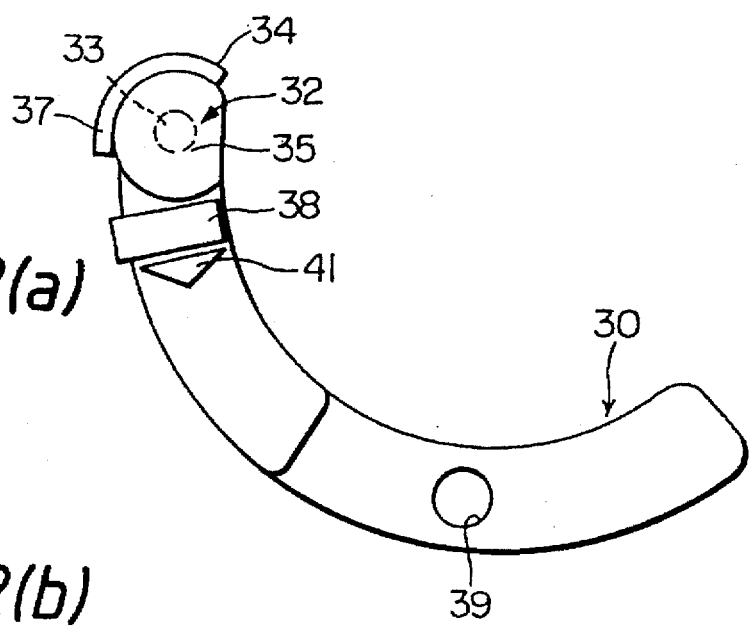
FIGS. 2(a) and 2(b) are a plan and a front view of a rotary plate in the first embodiment relating to the present invention.
Figure 2B:
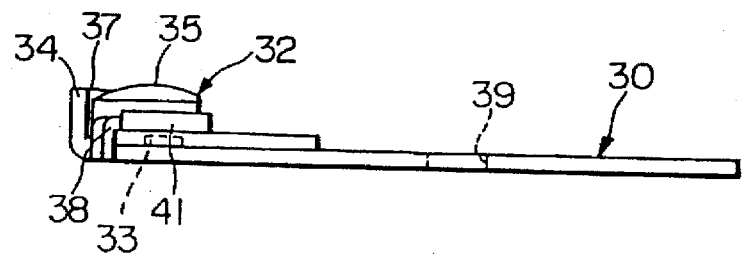
Figure 3:
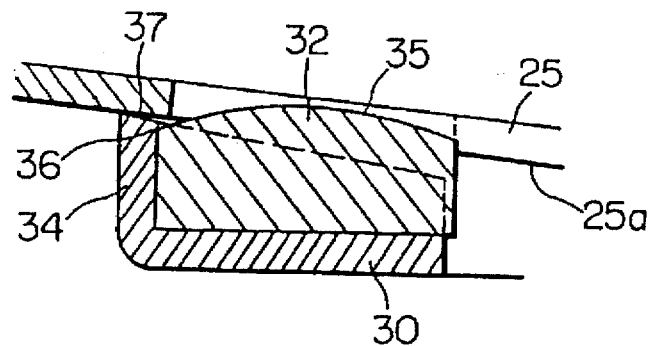
FIG. 3 is an explanatory diagram showing the relationship between the rotary plate and a disk hub in the first embodiment relating to the present invention.

FIGS. 1 to 8 are diagrams for explaining the first embodiment. FIG. 1 is a plan view of a disk chucking device relating to the present invention. FIGS. 2a and 2b a plan view and a front view of a support plate. FIG. 3 is an explanatory diagram showing the relationship between the support plate and a disk hub. FIGS. 4a and 4b are a plan view and a front view of the support plate. FIGS. 5a and 5b are a plan view and a front view of a drive pin. FIGS. 6a to 6f are explanatory diagrams showing the states of chucking operations schematically. FIGS. 7a, 7b, and 7c show B—B, C—C, and D—D cross sections of FIG. 6. FIGS. 8a and 8b show E—E and A—A cross sections of FIG. 6.

Figure 5A:
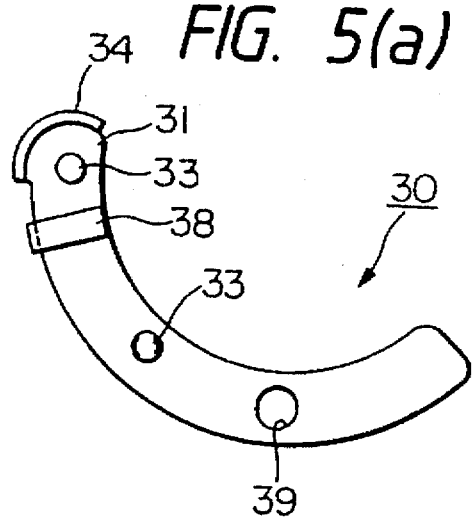
FIGS. 5(a) and 5(b) are a plan and a front view of a drive pin in the first embodiment relating to the present invention.
Figure 5B:
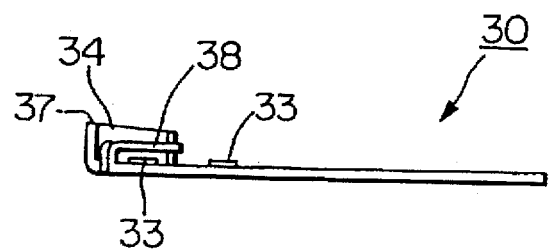

The first embodiment represents such a type that a drive pin does not sink under the bottom of a turntable. A support plate 30 is a rigid plate shaped substantially like a semi-arc as shown in FIGS. 2a and 2b. Alignment projections 33 for aligning a drive pin 32 are projecting from one end 31 of the support plate 30. The margin of the end 31 is folded up to form a contact wall 34. The contact wall 34 assumes part of a cylindrical shape along the outer circumference of the drive pin 32. The support plate 30 is bent, as shown in FIGS. 5a and 5b, from the side margin over the top thereof to form a locking claw 38. An attachment hole 39 is bored for attachment to a turntable 3.

Figure 4A:
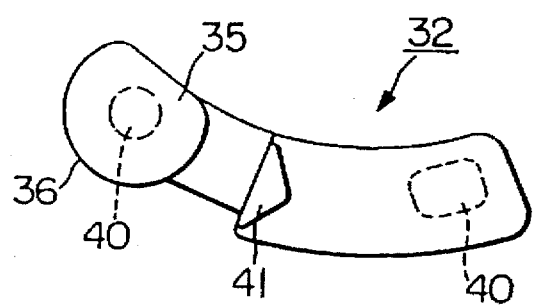
FIGS. 4(a) and 4(b) are a plan and a front view diagrams of the rotary plate in the first embodiment relating to the present invention.
Figure 4B:
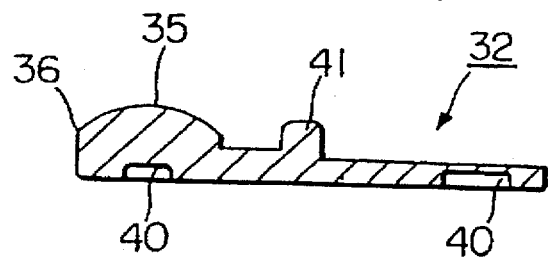

The drive pin 32 is shaped like a cylinder and made of a less frictional material such as a synthetic resin. The top 35 of the drive pin 32 has, for example, a spherical shape and becomes highest at its center. The periphery 36 of the top 35 of the drive pin 32 is lower than the top 37 of the contact wall 34. The inclination of the top 37 of the contact wall 34 is designed to be larger than the inclination of a metallic hub 25 lying on the top 37 of the contact wall 34. Thereby, even when the metallic hub 25 rides on the top of the contact wall 34, the bottom 25a of the metallic hub 25 can move onto the top 35 of the drive pin 32 smoothly. The drive pin 32 has, as shown in FIGS. 4a and 4b, alignment holes 40 on the bottom of the flat plate thereof.

When the drive pin 32 is attached to a rotary plate 30, the flat plate of the drive pin 32 is inserted while pushing the locking claw 38 apart against the elastic force of the claw 38. The alignment projections 33 are fitted in the alignment holes 40 for alignment. Then, the flat plate of the drive pin 32 is clamped due to the elastic force of the locking claw 38. 41 denotes a guide projection of the locking claw 38 projecting from the top of the flat plate of the drive pin 32.

The other components, which have not been described in particular, are identical to those in the aforesaid prior art.

The operations of the first embodiment of a disk chucking device having the aforesaid construction will be described.

Figure 6A:
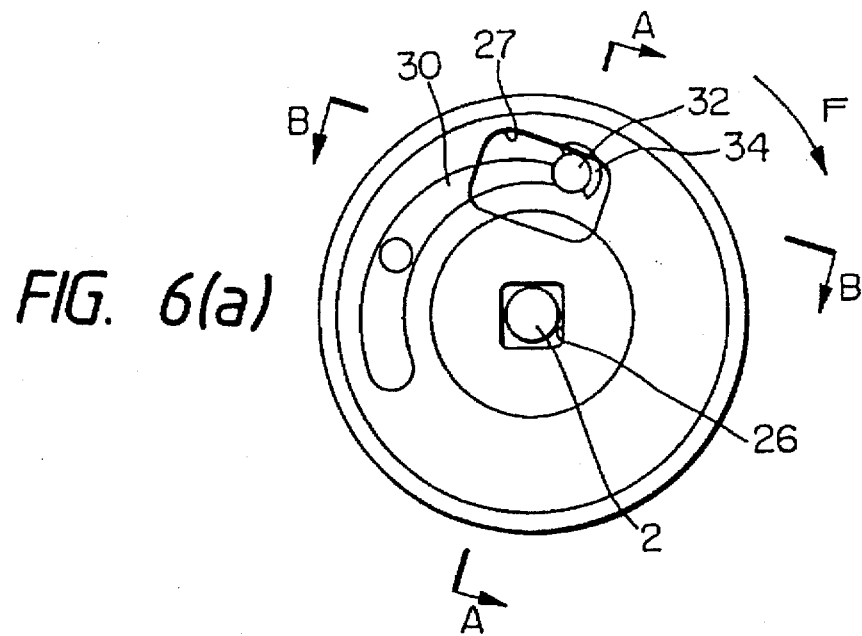
FIGS. 6(a), 6(b), 6(c), 6(d), 6(e) and 6(f) are plan views of chucking states in the first embodiment relating to the present invention.
Figure 7A:
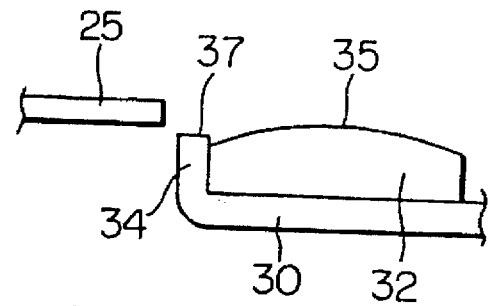
FIGS. 7(a), 7(b) and 7(c) are section views taken along lines BB, CC and DD of FIGS. 6(a), 6(b) and 6(c), respectively, showing the operations in the states of FIG. 6.
Figure 8A:
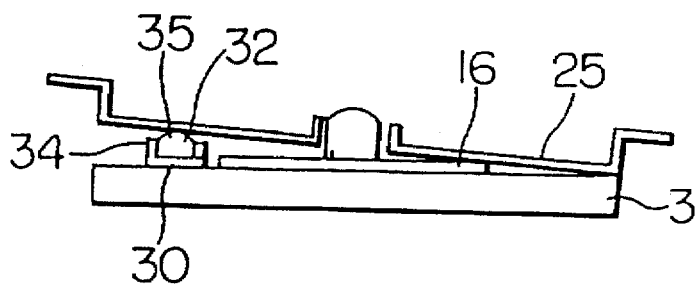
FIGS. 8(a) and 8(b) are section views taken along lines EE and AA of FIG. 6(d) and FIG. (a), respectively, showing the operations in the states of FIG. 6.
Figure 8B:
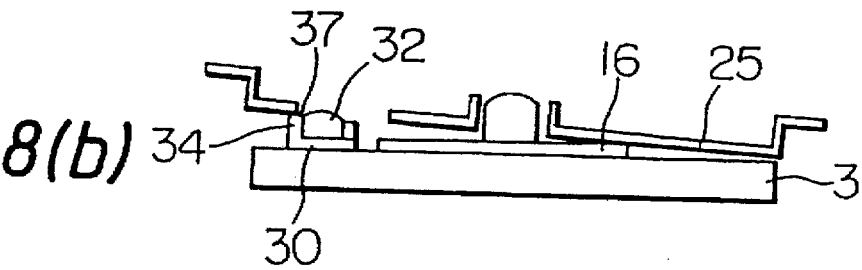

As described previously, soon after a disk cartridge 24 is loaded, a drive pin 32 may sometimes be in the state shown in FIGS. 6a, 7a, and 8b. Specifically, a top 37 of a contact wall 34 invades in a portion of a bottom 25a of a metallic hub 25.

Figure 6B:
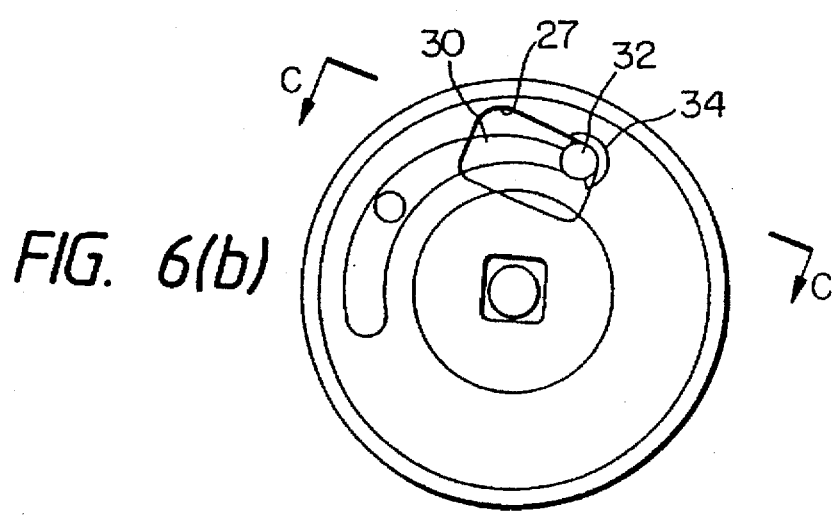
Figure 6C:
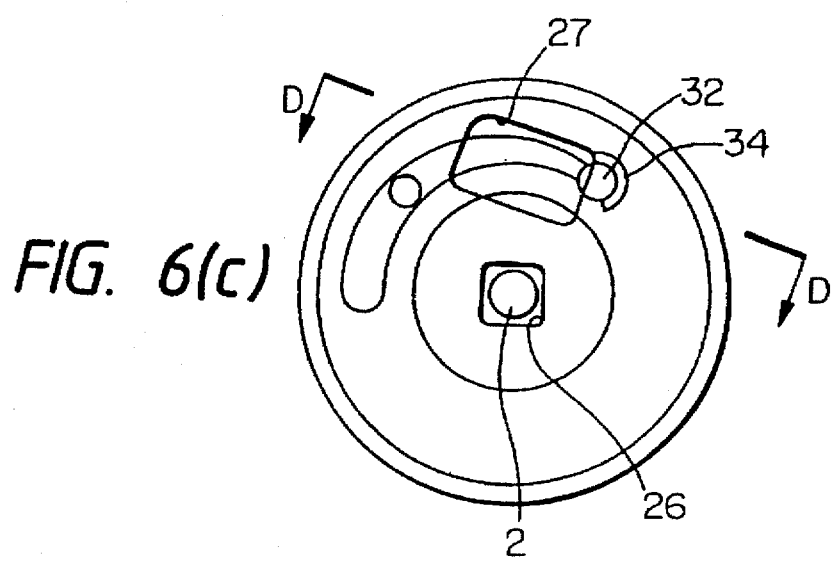
Figure 6D:
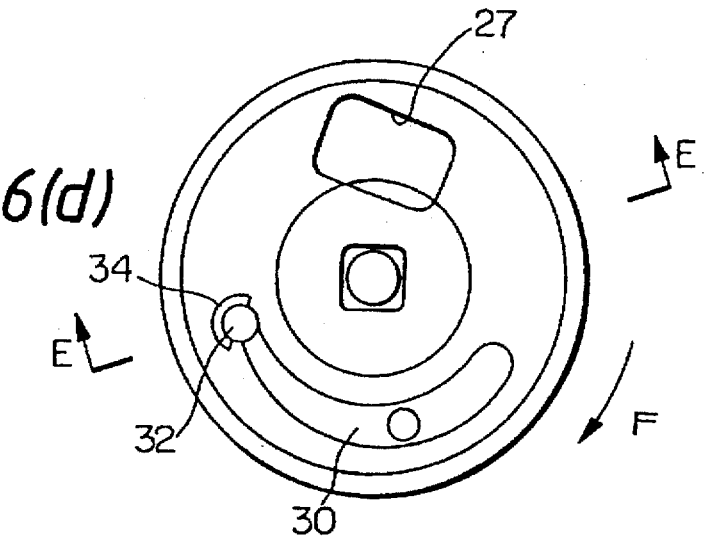
Figure 7B:
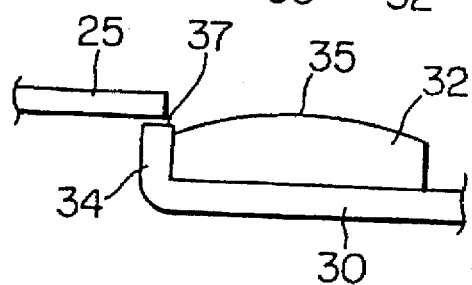
Figure 7C:
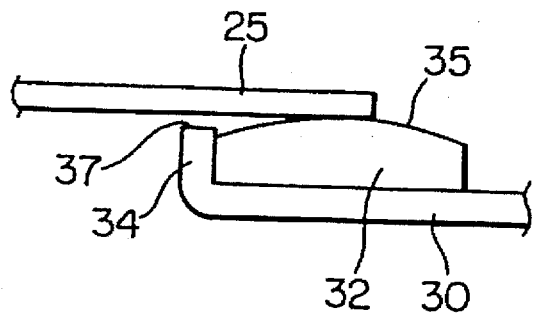

In the above state, when a turntable 3 rotates in an arrow-F direction in FIG. 6a, even if the metallic hub 25 rides on the top 37 of the contact wall 34, the metallic hub 25 will not hit a periphery 36 of the top of the drive pin 32 as shown in FIGS. 6b and 7b, but the bottom 25a of the metallic hub 25 moves smoothly onto the top 35 of the drive pin 32 as shown in FIGS. 6c and 7c. Then, the metallic hub 25 is rotated while sliding on the drive pin 32 made of a less frictional material as shown in FIGS. 6d and 8a.

Figure 6E:
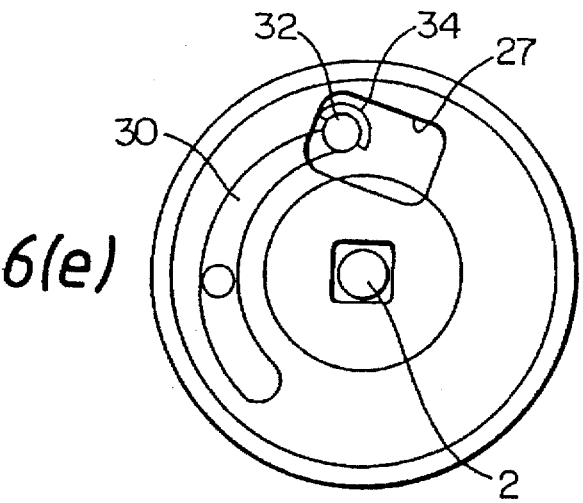
Figure 6F:
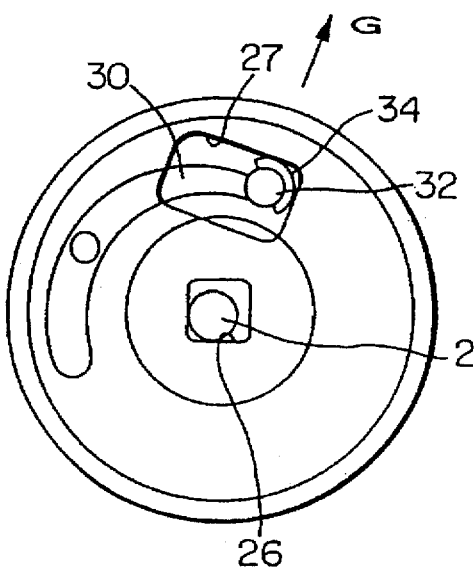

Then, the metallic hub 25 rotates while withstanding the frictional force occurring between the metallic hub 25 and the turntable 3 and between the metallic hub 25 and the drive pin 32 until the drive pin 32 comes to a position opposed to an alignment hole 27. Then, the drive pin 32 is fitted in the alignment hole 27 as shown in FIG. 6e, and brought into contact with the inner surface 27a of the outer circumference of the alignment hole 27. At this time, a head comes into contact with a disk 23, causing force in the opposite direction of the arrow-F direction. Thereby, force oriented in the radial direction of the metallic hub 25 develops in the contact wall 34. With the force, the metallic hub 25 is moved in the same direction. Consequently, a spindle 2 is pushed onto the corner 26a of a chucking hole 26 farthest from the alignment hole 27. Then, centering is carried out.

In the first embodiment having the aforesaid construction, a rotary plate 30 is formed with a plate. A contact wall 34 is formed as part of a drive pin 32 in the portion of the drive pin 32 engaging with a surface having a drive pin fitting hole. The drive pin 32 is made of a less frictional material. The apex of the top of the drive pin 32 lies higher than a top 37 of the contact wall 34. This realizes reduction in the number of parts. During alignment, the rigid portion of the drive pin 32 comes into contact with a metallic hub 25. This prevents abrasion of the drive pin, and permits reliable chucking. Even when the drive pin 32 rubs against a bottom 25a of the metallic hub 25, no trace occurs. This improves durability.

Furthermore, a periphery 36 of the top of the drive pin 32 lies lower than the top 37 of the contact wall 34. Therefore, even when the metallic hub 25 rides on the top 37 of the contact wall 34, the bottom 25a of the metallic hub 25 can move smoothly onto the top of the drive pin 32.

Figure 9:
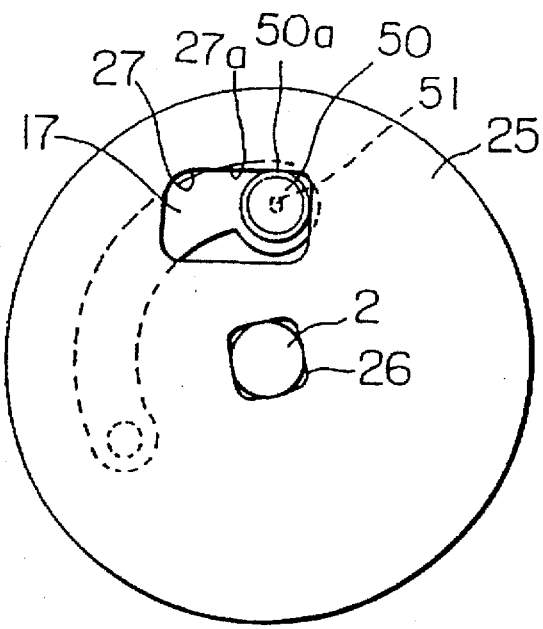
FIG. 9 is an explanatory diagram showing a construction of the second embodiment relating to the present invention.
Figure 10A:
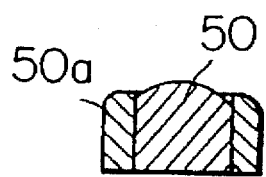
FIGS. 10(a) and 10(b) are section views showing structures of a drive pin in the second embodiment of the present invention.
Figure 10B:
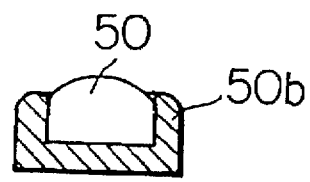
Figure 11:
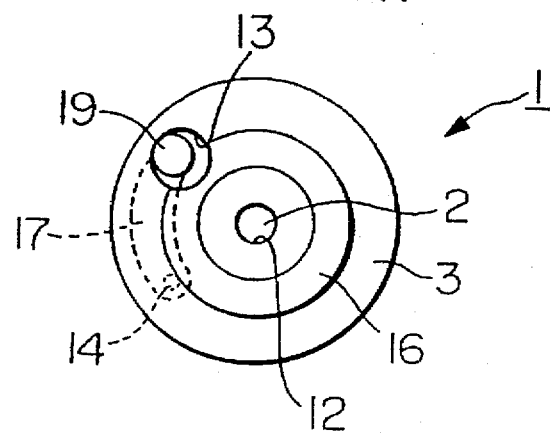
FIG. 11 is a plan view of a major portion of a disk chucking device of a prior art.
Figure 12A:
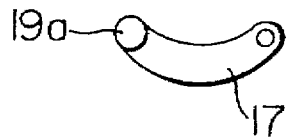
FIGS. 12 (a) and 12 (b) are a plan and a front view of a blade spring for the disk chucking device of a prior art.
Figure 12B:
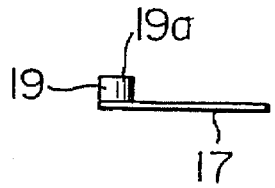
Figure 13A:
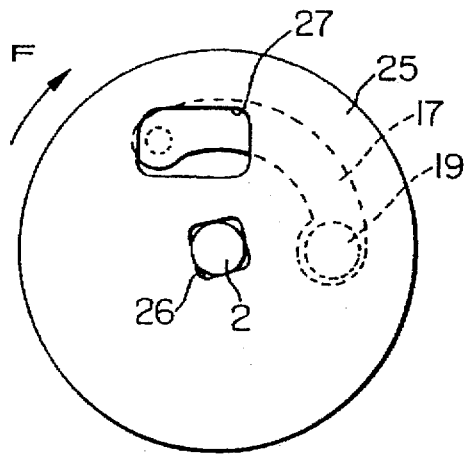
FIGS. 13(a), 13(b), 13(c) and 13(d) are plan views showing the operating states of the disk chucking device of a prior art.
Figure 13B:
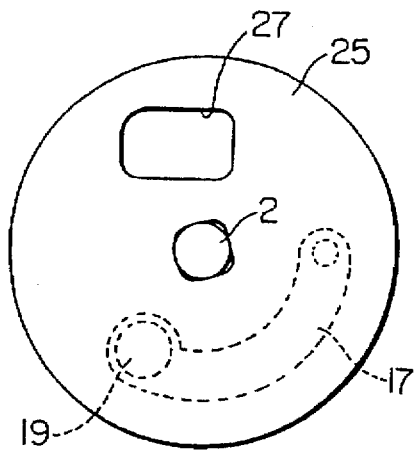
Figure 13C:
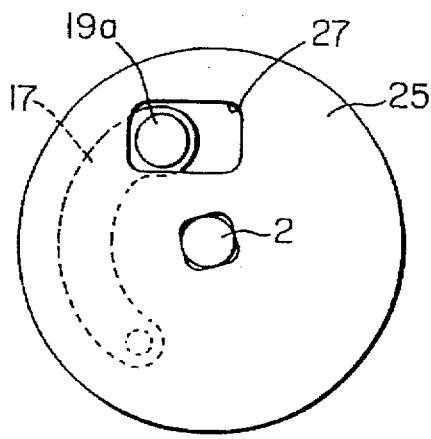
Figure 13D:
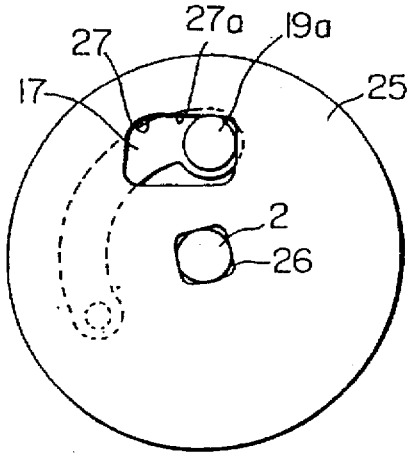
Figure 14A:
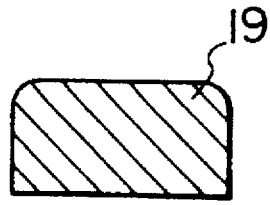
FIGS. 14(a) and 14(b) are section views showing structures of a drive pin for the disk chucking device of a prior art.
Figure 14B:
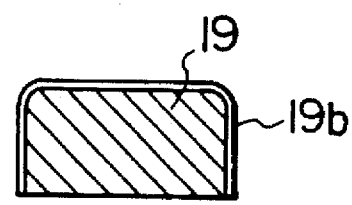
Figure 15:
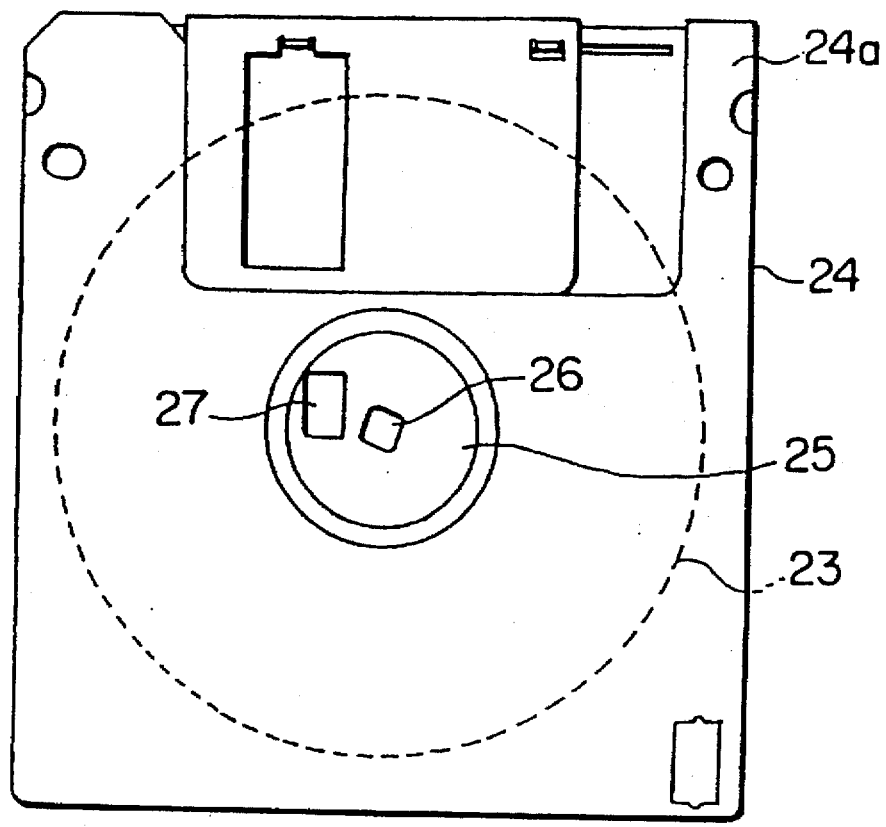
FIG. 15 is an explanatory diagram showing an example of a typical disk having a metallic hub.

Referring to FIGS. 9 and 10, the second embodiment of the present invention will be described. FIG. 9 is an explanatory diagram showing a construction of the second embodiment. FIG. 10 includes explanatory diagrams showing structures of a drive pin in the second embodiment.

The second embodiment is of the same type as the aforesaid prior art. Specifically, as shown in FIGS. 9 and 10a, a blade spring 17 is attached to the bottom of a turntable 3. A drive pin 50 is supported by a pin 51 at one end of the blade spring 17 so that the drive pin 50 can rotate freely. The drive pin 50 projects through an insertion hole 13 of the turntable 3. The drive pin 50 is made of a less frictional material such as a resin. A contact wall 50 made of a metallic material is formed to shield the peripheral surface of the drive pin 50. Alternatively, the drive pin 50 may be made of a resin, and a contact wall 50b made of a metallic material may be formed to shield the peripheral surface and bottom of the drive pin 50. The top of the drive pin 50 is projecting higher than the top end of the metallic contact wall 50a or 50b.

The other components and operations of the second embodiment, which have not be described in particular, are identical to those in the aforesaid prior art.

In the second embodiment, similarly to the aforesaid prior art, chucking is carried out (a chucking state is shown in FIG. 9). Specifically, as shown in FIG. 9, a drive pin 50 of a blade spring 17 is fitted in an alignment hole 27, and a metallic contact wall 50a is brought into contact with an inner surface 27a of the alignment hole 27. Then, centering is carried out.

Even the second embodiment having the aforesaid construction provides the same advantages as the first embodiment.

As described previously, according to the present invention, the number of parts can be reduced. During alignment, a rigid portion of a drive pin comes into contact with a metallic hub. This prevents abrasion of the drive pin, and permits reliable chucking. Even when the drive pin rubs against the bottom of the metallic hub, no trace occurs. This improves durability.

What is claimed is:

1. A disk chucking device for receiving and rotating an information recording disk, the information recording disk including a hub having a bottom surface defining a centrally-located spindle receiving hole and an alignment hole having an inner surface, said disk chucking device comprising:

a turntable having a center and a first surface;

a drive spindle fixedly connected to the turntable and located at the center, the drive spindle having a portion extending from the first surface of the turntable; and a metal support plate mounted on the turntable, said support plate having an end portion bent away from the first surface to form an integral contact wall, said support plate including a drive pin mounted thereon adjacent the contact wall, the drive pin being made of a synthetic resin and extending a first distance from the first surface, said contact wall being located adjacent said drive pin, said contact wall extending a second distance from the first surface;

wherein the synthetic resin has a lower coefficient of friction than the metal of the support plate;

wherein the first distance is greater than the second distance; and wherein when the information recording disk is received for rotation by the disk chucking device, the drive spindle is received in the spindle receiving hole of the information recording disk, and said drive pin slides against the bottom surface of the hub until both said drive pin and said contact wall are received in the alignment hole of the information recording disk such that the contact wall abuts the inner surface of the alignment hole during rotation of the information recording disk.

2. The disk chucking device according to claim 1 wherein said drive pin includes a semi-spherical upper end.

3. The disk chucking device according to claim 1 wherein the contact wall is semi-cylindrical.

4. The disk chucking device according to claim 1 wherein said support plate is rigid.

5. The disk chucking device according to claim 1 wherein said support plate comprises a blade spring.

6. A disk chucking device for receiving and rotating an information recording disk, the information recording disk including a hub having a bottom surface defining a centrally-located spindle receiving hole and an alignment hole having an inner surface, said disk chucking device comprising:

a turntable having a center, a first surface and a second surface, the turntable defining a drive pin inserting hole;

a drive spindle fixedly connected to the turntable and located at the center, the drive spindle having a portion extending from the first surface of the turntable; and a metal blade spring mounted on the second side of the turntable, said blade spring having a first end attached to the turntable and a free end, a portion of the free end being bent to form an integral contact wall, the blade spring including a drive pin made of a synthetic resin, the drive pin and contact wall being biased through the drive pin inserting hole such that the drive pin extends a first distance above the first surface and the contact wall extends a second distance above the first surface;

wherein the synthetic resin has a lower coefficient of friction than the metal of the support plate;

wherein the first distance is greater than the second distance; and wherein when the information recording disk is received for rotation by the disk chucking device, the drive spindle is received in the spindle receiving hole of the information recording disk, and said drive pin slides against the bottom surface of the hub until both said drive pin and said contact wall are received in the alignment hole of the information recording disk such that the contact wall abuts the inner surface of the alignment hole during rotation of the information recording disk.

7. The disk chucking device according to claim 6 wherein said drive pin includes a semi-spherical end.

8. The disk chucking device according to claim 6 wherein the contact wall is semi-cylindrical.

* * * * *